United States Patent
Arima

(10) Patent No.: US 7,792,391 B2
(45) Date of Patent: Sep. 7, 2010

(54) INSPECTING OCR CHARACTERS BY DISPLAYING ADJACENT CHARACTER IMAGES

(75) Inventor: Toshimichi Arima, Fujisawa (JP)

(73) Assignee: International Business Machines Corporation, Armonk, NY (US)

(*) Notice: Subject to any disclaimer, the term of this patent is extended or adjusted under 35 U.S.C. 154(b) by 1088 days.

(21) Appl. No.: 11/435,080

(22) Filed: May 16, 2006

(65) Prior Publication Data

US 2007/0122064 A1 May 31, 2007

(30) Foreign Application Priority Data

May 17, 2005 (JP) ............................. 2005-144535

(51) Int. Cl.
*G06K 7/10* (2006.01)
(52) U.S. Cl. ..................................... 382/321; 358/474
(58) Field of Classification Search ................. 382/100, 382/181, 182, 185, 187, 189, 190, 195, 203, 382/206, 321; 235/435, 462.01; 358/474–498
See application file for complete search history.

(56) References Cited

U.S. PATENT DOCUMENTS

| | | | | |
|---|---|---|---|---|
| 5,455,875 A | * | 10/1995 | Chevion et al. | 382/311 |
| 5,883,986 A | * | 3/1999 | Kopec et al. | 382/310 |
| 5,966,473 A | * | 10/1999 | Takahashi et al. | 382/292 |
| 6,144,765 A | * | 11/2000 | Tamura et al. | 382/197 |
| 7,466,861 B2 | * | 12/2008 | Katoh et al. | 382/225 |
| 2004/0001629 A1 | * | 1/2004 | Arima | 382/189 |
| 2004/0228533 A1 | * | 11/2004 | Adelmann | 382/232 |
| 2005/0100217 A1 | * | 5/2005 | Abdulkader et al. | 382/186 |
| 2005/0232495 A1 | * | 10/2005 | Katoh et al. | 382/225 |
| 2008/0031500 A1 | * | 2/2008 | Scholze | 382/124 |
| 2008/0310738 A1 | * | 12/2008 | Katoh et al. | 382/225 |

FOREIGN PATENT DOCUMENTS

JP 2004-038348 2/2004

OTHER PUBLICATIONS

Les Niles, "Multipage Document Images on the Internet", Mar. 25, 1996, SPIE.*

* cited by examiner

*Primary Examiner*—Anand Bhatnagar
(74) *Attorney, Agent, or Firm*—Joseph E. Bracken, Esq.; Steven M. Greenberg, Esq; Carey Rodriguez Greenberg & Paul LLP

(57) ABSTRACT

To provide a system for reducing oversight of the result of false recognition and improving working efficiency, while realizing the reduction of load of operators, and to provide a method thereof.

The system in the invention contains a display unit and a control unit for controlling the display unit, and may display a plurality of unit images in series on the display unit, wherein the display unit includes a first display area and a second display area controlled by the control unit, and the control unit controls so that the display of the unit image on the first display area may differ from the display of the unit image on the second display area in the format thereof. The control unit may be made so as to include a means for adjusting the transferring distance of a plurality of the unit images per unit time. Furthermore, the control unit may be made so as to display the unit images while keeping the unit images stood still for a given period of time on the first display area, and so as to display the unit images while transferring the unit images in given scrolling direction on the second display area.

18 Claims, 15 Drawing Sheets

INSPECTING OCR CHARACTERS BY DISPLAYING ADJACENT CHARACTER IMAGES

FIELD OF THE INVENTION

The present invention relates to a system, a display method, and a program using the same that provide a user interface of an image scanner or of OCR (Optical Character Recognition). Particularly, the present invention relates to a system, a display method, and a computer program using the same that are used when an operator performs visual inspection of letters or characters recognized with an image scanner or OCR.

BACKGROUND OF THE INVENTION

In recent years, OCR devices and computers having the OCR function for optically reading out graphic forms, letters, characters and the like and forming images thereof, and comparing the images with reference patterns of graphic forms, letters, characters and the like to recognize the images as specific graphic forms, letters, characters and the like, have become widespread. With the spread of the OCR capable of transforming the letters or characters written by human beings on data entry sheets into an electronic form, data processing operations have been accelerated.

Meanwhile, the OCR device is required to handle various kinds of graphic forms, letters, characters and the like in a great amount, and thus, there is a possibility of false recognition. This creates a need for an operator to visually check the recognition results of the OCR device and correct the results of false recognition. However, a problem arises wherein in this correcting process, operators are required to check all the recognition results, so that increased working efficiency is desired, and but increasing the working efficiency may lead to greater load of operators.

Patent Document 1 listed below discloses an inspection method wherein, as shown in FIG. 14, character images that were recognized by OCR to be the same characters are displayed and checked at once so as to improve working efficiency. As shown in FIG. 14, character images that were recognized by OCR to be "2" are displayed all together in an area 1, while those recognized by OCR to be "3" are displayed all together in an area 2. An operator performs visual inspection of the character images displayed in area 1 or area 2 while moving the line of sight in a lateral direction, finds any character images falsely recognized (i.e., foreign matters) therefrom, and corrects the false recognition results. In this technique, visual inspection can be performed collectively for the specific character images, so that the working efficiency in finding the false recognition results improves.

With the technique disclosed in Patent Document 1, however, the operator is required to move the line of sight in the lateral direction during the visual inspection. Thus, there is the risk of oversight of the character images or skipping of the rows to be inspected due to such gaze movement. Furthermore, with a large amount of gaze movement of the operator, the problem of large work burden on the operator remains unsolved.

Further, Patent Document 2 listed below discloses an inspection method wherein, as shown in FIG. 15, character images recognized by OCR are continuously displayed on an image confirmation portion in series. According to the method disclosed in Patent Document 2, the character images of the same recognition results are displayed in series on the "image confirmation portion" at the lower right in FIG. 15, and then made to flow (in the direction shown by an arrow) to a list display portion provided on its left.

When the operator watching the image confirmation portion finds a false recognition result, he/she performs a stop operation. After the operator finds the false recognition result, by the time when the stop operation is completed, the false recognition result will move to the list display portion. However, the relevant false recognition result is displayed on the list display portion, so that the operator can find it to mark or correct it.

According to the inspection method of Patent Document 2, the operator is allowed to fix the line of sight at the area of the image confirmation portion, which can reduce strain on the operator's eyes compared to the method of Patent Document 1. However, if the number of places in the image confirmation portion is increased to improve the working efficiency, the risk of oversight of the false recognition results by the operator would increase accordingly, so that the flow speed of the character images cannot be increased. Further, in the case of letters, such as numerical figures, of which outer shapes may suffer deformation to a great extent, instantaneous judgment would be difficult, in which case the speed of inspection would considerably decrease and the operator's burden would increase as well. The operator is required to gaze the image confirmation portion unblinkingly. As such, it cannot necessarily be said that the operator's burden is reduced.

[Patent Document 1] U.S. Pat. No. 5,455,875

[Patent Document 2] Japanese Unexamined Patent Document (Kokai) No. 2004-038348

SUMMARY OF THE INVENTION

As described above, conventionally, there are problems of a great amount of movement of line of sight of the operator and a great amount of work burden on the operator, in the work of finding a false recognition result (foreign matter) from among a large amount of same recognition results.

The present invention has been made in view of the above-described problems, and the object of the present invention is to provide a display method and system by which oversight of the result of false recognition can be reduced and working efficiency is improved while realizing the reduction of load of operators, in the work of finding a false recognition result (foreign matter) from among a large amount of same recognition results.

According to the present invention, there is provided a system that contains a display unit and a control unit for controlling the display unit, and may display a plurality of unit images in series on the display unit, wherein the display unit includes a first display area and a second display area controlled by the control unit, and the control unit controls so that the display of the unit image on the first display area may differ from the display of the unit image on the second display area in the format thereof.

The control unit may include means for adjusting the transferring distance of a plurality of the unit images per unit time.

Furthermore, the control unit may display the unit images while keeping the unit images stood still for a given period of time on the first display area, and so as to display the unit images while transferring the unit images in given scrolling direction on the second display area.

Furthermore, the control unit may scroll a plurality of unit images to the display unit in given scrolling direction, and the display unit may be made so as to contain the second display area on the upstream side and/or downstream side in the given scrolling direction to the first display unit.

Furthermore, the control unit may display the unit image on the second display area in a size greater than a size of the unit image on the first display area.

Furthermore, the control unit may display the unit image on the second display area while enlarging the unit image than the unit image on the first display area.

Furthermore, the control unit may display the unit images on the second display area while increasing an enlargement factor of the unit image as a distance of the unit image from the first display area increases.

Furthermore, the number of the unit images in the given scrolling direction displayed on the second display area may be greater than the number of the unit images in the given scrolling direction displayed on the first display area.

Furthermore, the number of the unit images in a direction orthogonal to the given scrolling direction displayed on the second display area may be equal to the number of the unit images in the direction orthogonal to the given scrolling direction displayed on the first display area.

Furthermore, the unit image may include a character image.

Furthermore, the control unit may differentiate a color of a portion in the unit image other than the character image on the first display area from a color of a portion in the unit image other than the character image on the second display area.

Furthermore, the color of the portion in the unit image other than the character image may be yellow or blue.

Furthermore, the system may contain a storage unit for storing data of the unit images in which the character images are included, wherein the control unit may be made so as to display the unit images on the first display area and the second display area based on the data of the unit images.

Furthermore, the system may contain an OCR unit that may judge the kind of characters included in the unit image on the basis of the character images obtained by optically reading out characters, wherein the storage unit may be made so as to store a plurality of the unit images that were judged to include specific characters in the OCR unit, and the control unit may be made so as to display a plurality of the unit images that were judged to include the specific characters, all together on the first display area and the second display area.

Furthermore, the characters may be hand-written characters on a recording medium.

Furthermore, the system may contain an editing unit for changing the kind of the characters included in the unit image according to a user operation.

According to the present invention, there is also provided a method for displaying a plurality of unit images in series in a system containing a first display area and a second display area, including the step of displaying the plurality of unit images on the first display area and the second display area of the system while differentiating the formats thereof from each other.

Furthermore, the unit image may include a character image, and the method may be made so as to include the steps of: storing data of the unit images including the character images; and displaying the unit images on the first display area and the second display area based on the data of the unit images.

Furthermore, the method may include the steps of: obtaining the character images by optically reading out characters; judging the kind of characters included in the unit image on the basis of the character images; and displaying a plurality of the unit images that were judged to include the specific characters on the first display area and the second display area.

According to the present invention, there is also provided a computer program for causing a computer system containing a first display area and a second display area to display a plurality of unit images in series, wherein the computer program causes the computer system to perform the step of displaying the plurality of unit images on the first display area and the second display area of the computer system while differentiating the formats thereof from each other.

According to the present invention, a plurality of display areas including a first display area and a second display area are provided, and therefore, while an operator (user) gazes the first display area, the operator can see the second peripheral area with the peripheral vision and is allowed to look ahead and/or follow up (or reconfirm) the inspection results. Further, even if the operator cannot follow the inspection speed in the first display area, he/she can perform the follow-up inspection on the second display area with peripheral vision. The fact that the look-ahead and/or follow-up (or reconfirmation) inspection can be performed provides the operator with enough job allowance for work. Further, according to the present invention, the movement of the operator's line of sight can be reduced to a minimum, which can reduce strain on his/her eyes.

DETAILED DESCRIPTION OF THE INVENTION

Hereinafter, an embodiment of the system, display method and program using the same according to the present invention will be described.

Figure 1:
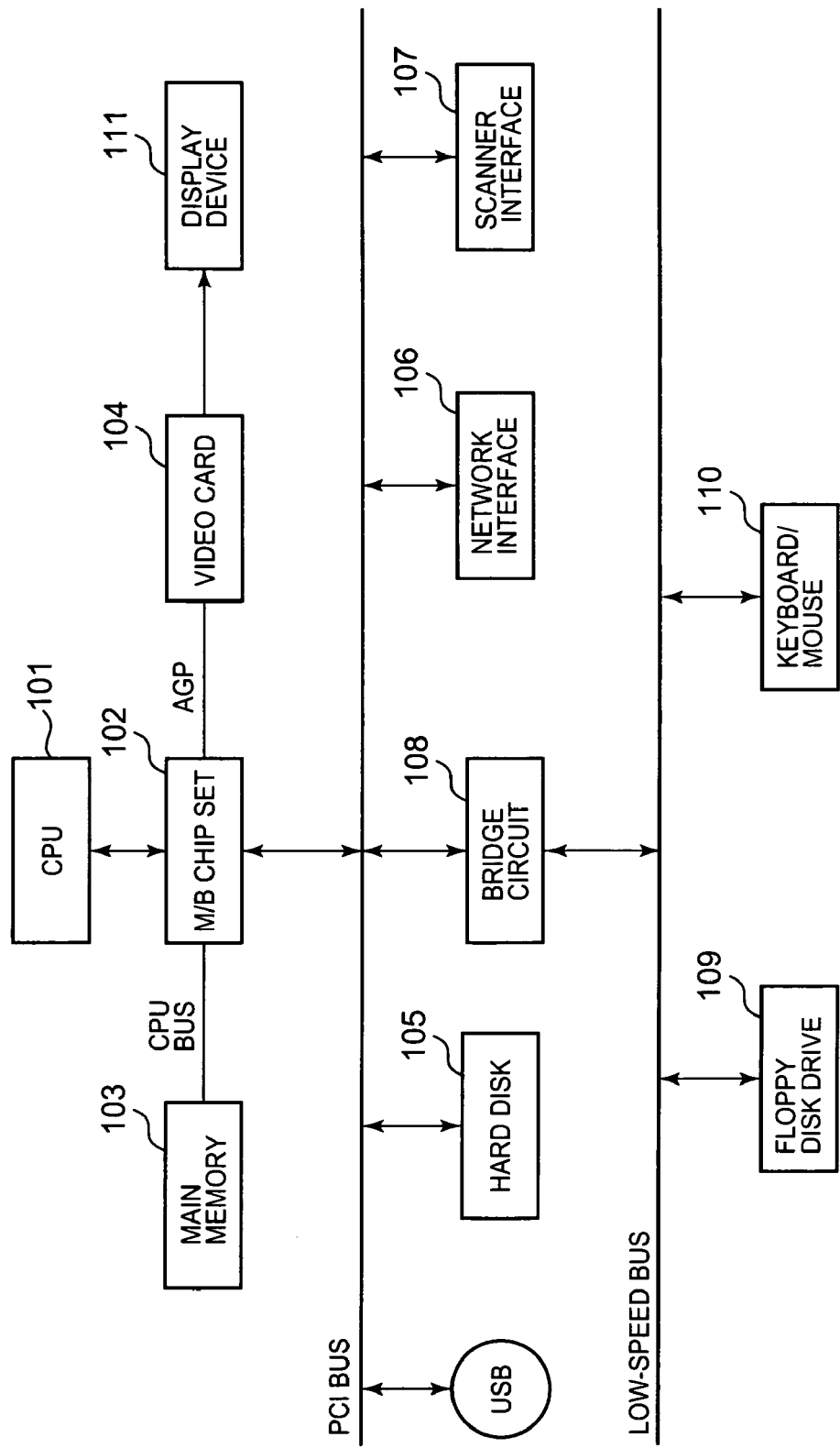
FIG. 1 is a diagram schematically showing a hardware configuration example of a computer apparatus implementing the system according to an embodiment of the present invention.

Reference is made to FIG. 1. FIG. 1 is a diagram schematically showing an example of a hardware configuration of a computer apparatus that implements the system according to the present embodiment. The computer apparatus shown in FIG. 1 includes a CPU (Central Processing Unit) 101 serving as arithmetic means; a main memory 103 connected to CPU 101 via a M/B (motherboard) chip set 102 and a CPU bus; a video card 104 connected to CPU 101 via same M/B chip set 102 and an AGP (Accelerated Graphics Port); a display device 111 that displays graphic data generated in video card 104; a hard disk 105 and a network interface 106 and a scanner interface 107 transmitting image data read (scanned) by an image scanner (not shown) that are connected to M/B chip set 102 via a PCI (Peripheral Component Interconnect) bus; and a floppy (registered trademark) disk drive 109 and a keyboard/mouse 110 that are connected to M/B chip set 102 via the PCI bus and a bridge circuit 108 and a low-speed bus such as an ISA (Industry Standard Architecture) bus. A liquid crystal display (LCD) or a CRT display, for example, may be used as display device 111.

It is noted that FIG. 1 merely shows an example of the computer apparatus realizing the present embodiment, and the configuration may be changed in design as appropriate as long as it can implement the system of the present embodiment. For example, instead of providing video card 104, a video memory alone may be incorporated, in which case CPU 101 may be configured to process video data. A sound mechanism enabling input/output of voice may be provided, or a drive of CD-ROM (Compact Disc Read Only Memory) or DVD-ROM (Digital Versatile Disc Read Only Memory) may be provided via an interface such as an ATA (AT Attachment).

Further, in the hardware configuration example shown in FIG. 1, scanner interface 107 receives image data from an externally connected scanner. Alternatively, an OCR device provided with a scanner mechanism may be connected to scanner interface 107, in which case information including letter recognition results may be received from the OCR device together with the image data. The scanner or the OCR device reads characters such as letters or the like on a recording medium like paper (including both printed ones and handwritten ones), and generates the image data.

Figure 2:
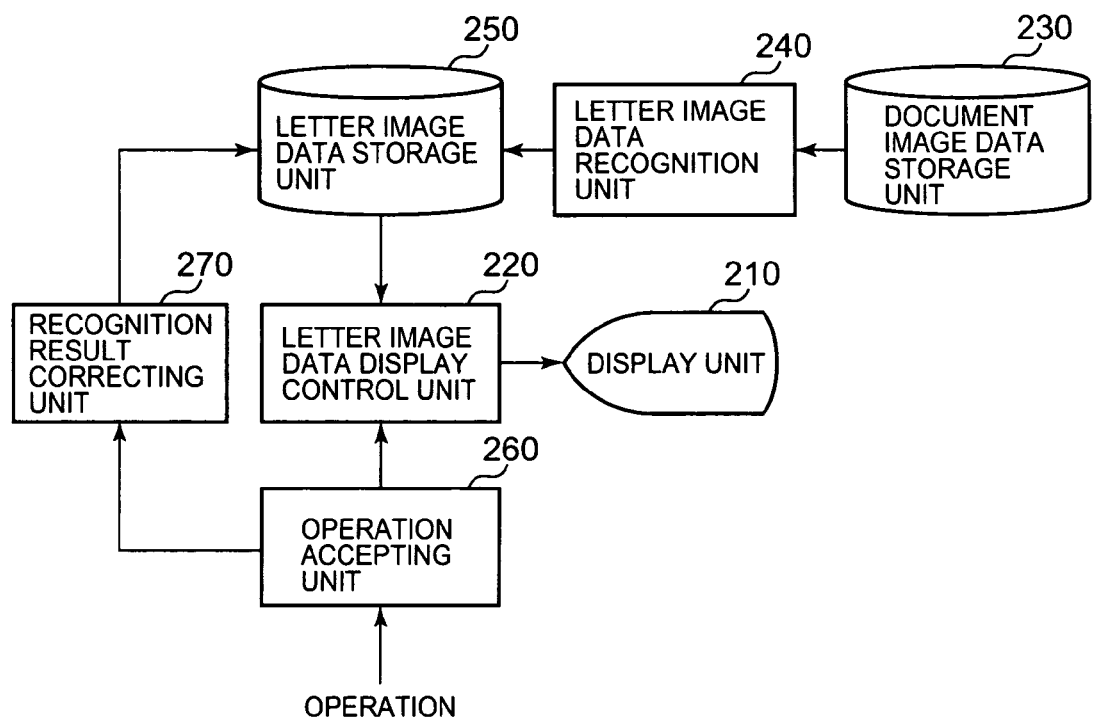
FIG. 2 is a block diagram illustrating a function of the system according to the embodiment of the present invention.

FIG. 2 is a block diagram illustrating a function of the system according to the present embodiment. The system of the present embodiment includes a display unit 210 that displays a screen for visual inspection of recognition results of the image scanner; a letter image data display control unit 220 that controls scroll display of letter image data and reference images in a plurality of display areas of display unit 210 and also serves as an editing unit for changing the kind of the letter image data included in a unit image; a document image data storage unit 230 that stores the scanned image data; a letter image data recognition unit 240 that reads the letter image data from document image data storage unit 230, compares the letter image data with a plurality of reference data items and recognizes the letter image data as specific letters based on the closest reference data; a letter image data storage unit 250 that stores the letter image data recognized as the specific letters while dividing them into groups based on the recognition results thereof; an operation accepting unit 260 that calls various functions based on operations by the operator (by detecting the operations); and a recognition result correcting unit 270 that corrects the recognition result of the letter image data in accordance with the operation of the operator accepted at operation accepting unit 260. Document image data storage unit 230 and letter image data recognition unit 240 may be combined to be an OCR unit.

In the present embodiment, the case of using letters as representatives of image data is explained. The system and display method of the present invention however are not limited to the letters, but any characters including letters (including hiragana letters, katakana letters and Chinese characters), numerical figures and symbols, and even graphic figures may be handled as the image data.

Figure 3:
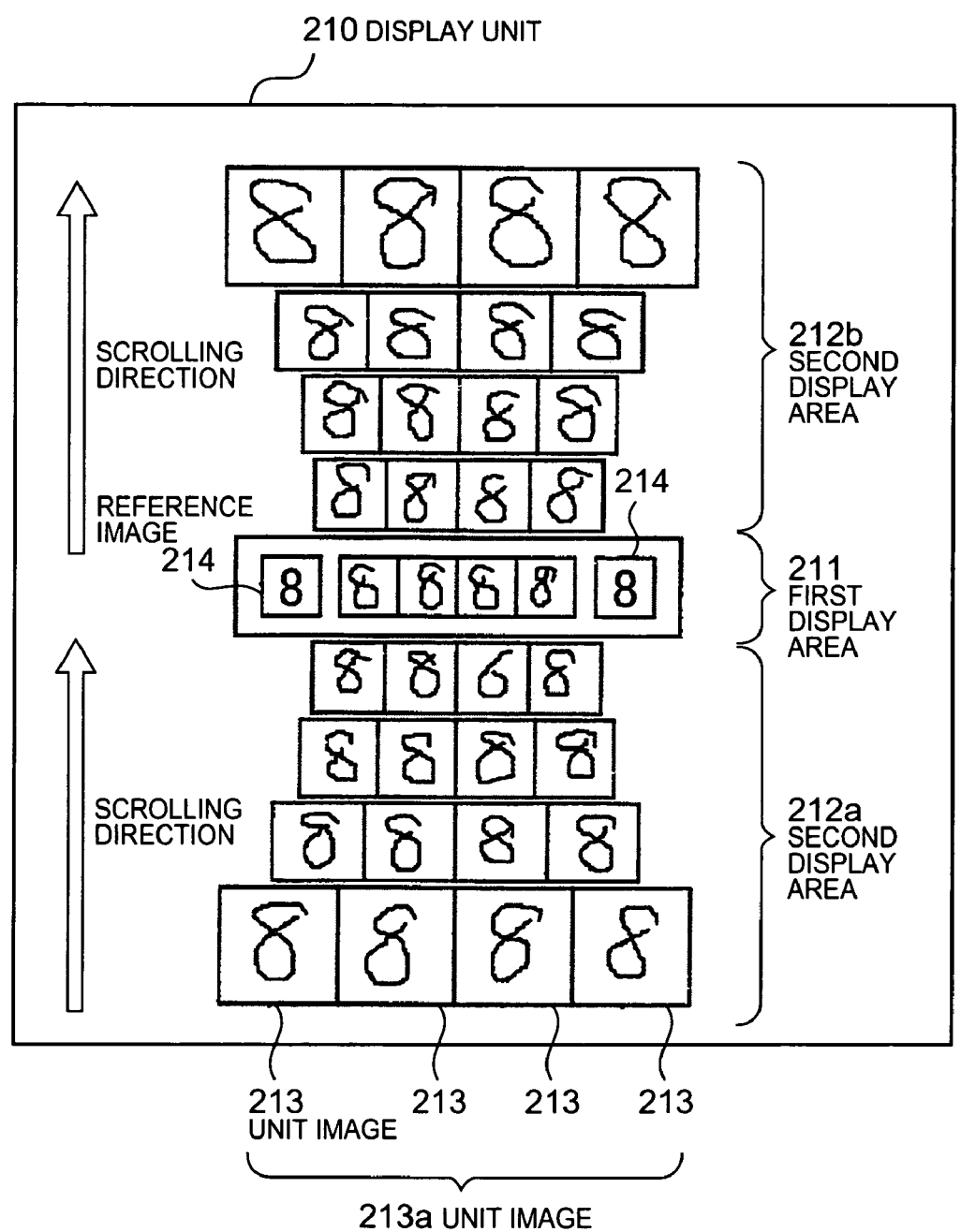
FIG. 3 is a display example of a display unit 210 in the system and display method according to the embodiment of the present invention.

Reference is now made to FIG. 3. FIG. 3 shows a display example of display unit 210 in the system and display method of the present embodiment. Display unit 210 displays a first display area 211, and second display areas 212a and 212b. First display area 211 is the area (also referred to as "gaze area") which the operator usually gazes. Of the two second display areas, second display area 212a is the area where unit images 213 that are scrolled from the lower part of display unit 210 toward first display area 211 are displayed, which is also referred to as the "inspection-awaiting area". The other second display area 212b is the area where unit images 213 that are scrolled from first display area 211 toward the upper part of display unit 210 are displayed, which is also referred to as the "inspection-finished area". In display unit 210, the direction shown by the outlined arrows corresponds to the scrolling direction of the unit images. In the present embodiment, second display areas 212a and 212b are provided on the upstream side and the downstream side, respectively, in the scrolling direction of unit images 213 with respect to first display area 211. In the present embodiment, the unit images are scrolled from the lower part toward the upper part of display unit 210. Not limited thereto, they may be scrolled from the upper part toward the lower part, or may be scrolled in a lateral direction, as will be explained later in other embodiments.

Figure 5:
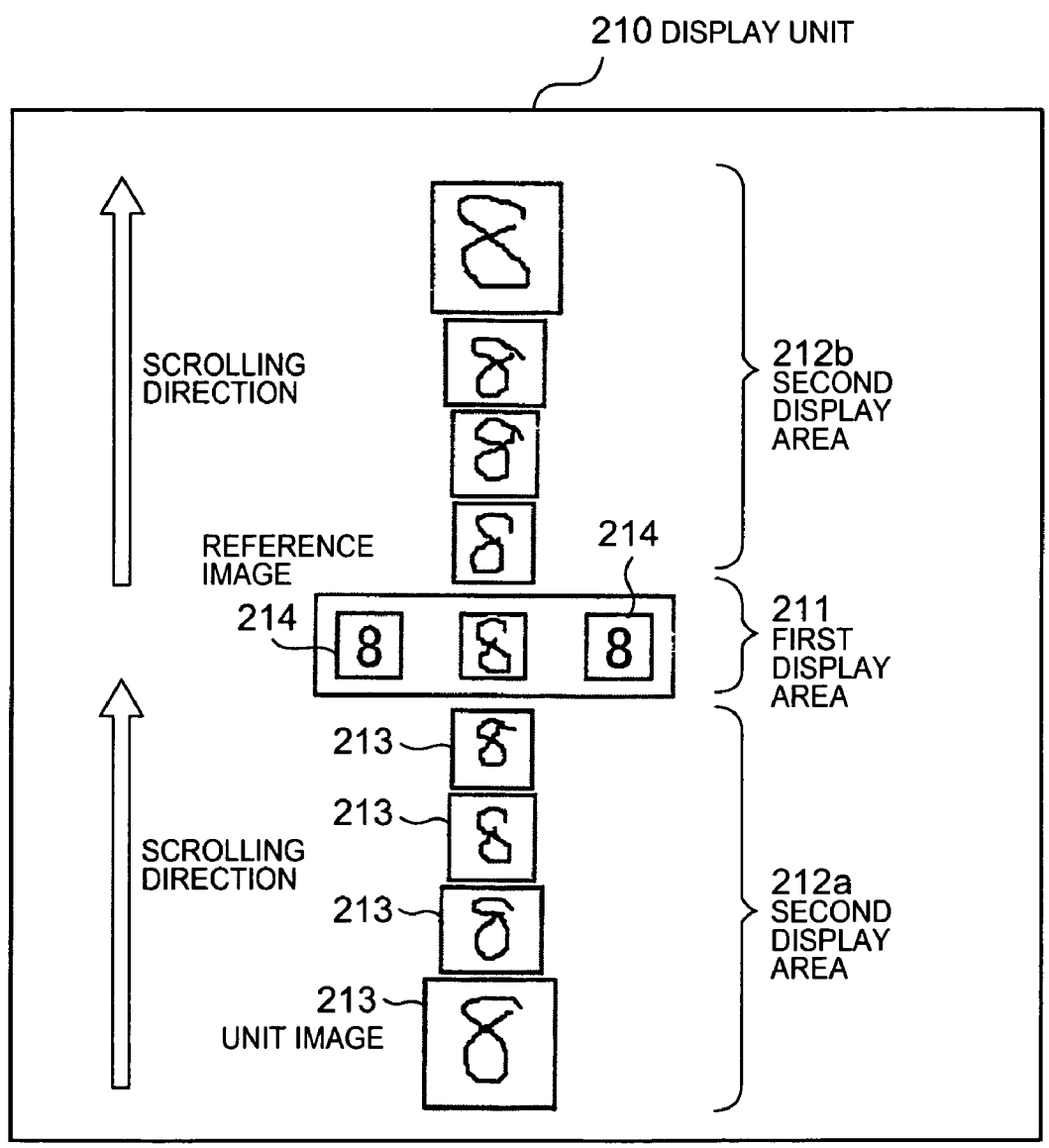
FIG. 5 is a display example of display unit 210 in the system and display method according to the embodiment of the present invention.

Unit images 213 are the images that display respective letter image data items that were recognized as specific letters by letter data recognition unit 240 and stored in letter image data storage unit 250 in groups based on the recognition results. In FIG. 3, a plurality of letter image data items recognized to be identical to reference data "8" are displayed as the unit images. Four unit images 213 arranged side by side in the lateral direction are collectively referred to as a "unit image set" 213a. Although the case where four unit images 213 are arranged in the lateral direction is explained in the present embodiment, not limited thereto, at least one and preferably at most four unit images may be arranged as appropriate. For example, FIG. 5 shows a screen example in which one unit image 213 alone is scrolled. In the case where one unit image 213 alone is scrolled as well, reference images 214 may be provided in first display area 211, as shown in FIG. 5.

Reference is made again to FIG. 3. Reference images 214 arranged and displayed to sandwich the four unit images therebetween in first display area 211 are the images displaying reference data, which is "8" in the present embodiment. These reference images may be made so as to be displayed as shown in FIG. 3, or may be made so as not to be displayed. It may be configured such that an operator can determine, or the system automatically determine, the letter image data to be selected as the unit images.

In the system of the present invention, unit image set 213a having a plurality of unit images arranged side by side moves smoothly on second display area 212a, first display area 211 and second display area 212b in this order. To move "smoothly" refers to the extent that the unit images look to the operator as if they were moving, and that they do not look like being switched. The degree of this "smoothness" changes depending on the size of the screen, the number of pixels and the like. Further, adjustment of "smoothness" is carried out by adjusting the transferring distance of the unit images per unit time. Letter image data display control unit 220 performs this adjustment of "smoothness".

Further, in the system of the present invention, the display of unit images 213 on first display area 211 and the display of unit images 213 on second display areas 212a and 212b differ in the format thereof. More specifically, as shown in FIG. 3, in second display areas 212a and 212b, unit images 213 increase in size as the distance from first display area 211 increases. In other words, in second display area 212a, unit images 213 decrease in size (the enlargement factor of unit images 213 decreases) as they are scrolled from the lower part of display unit 210 toward first display area 211, while in second display area 212b, unit images 213 increase in size (the enlargement factor of unit images 213 increases) as they are scrolled from first display area 211 toward the upper part of display unit 210. As unit images 213 increase or decrease in size, the letter images of unit images 213 increase or decrease in size accordingly. Letter image data display control unit 220 carries out such adjustment of the enlargement factor of the unit images. For unit images 213 in second display areas 212a and 212b, the enlargement factor in the longitudinal direction and the enlargement factor in the lateral direction may be changed. In the present embodiment, the enlargement factor is changed as the unit image moves by one pixel, although the present invention is not limited thereto.

The system of the present invention allows the operator to visually check unit images 213 in first display area 211 by directing line of sight onto first display area 211 and, in addition, to visually check unit images 213 in second display areas 212a and 212b with peripheral vision. The operator's peripheral vision is generally inferior to the central vision. Thus, in the present invention, unit images 213 in second areas 212a and 212b where the visual inspection is to be carried out with peripheral vision are increased in size to enable auxiliary inspection with peripheral vision. Further, in the system of the present invention, second display areas 212a and 212b where the peripheral vision is used for the visual inspection extend only in one-dimensional direction (in two directions of up and down in this embodiment) with respect to first display area 211. This can suppress distraction of the operator's attention compared to the case where information is arranged in two-dimensional direction (in four directions of up, down, left and right) with respect to first display area 211.

Hereinafter, a procedure of visual inspection by an operator using the system of the present invention will be described.

Firstly, when an operation such as click or selection is performed on a button for starting the visual inspection from among the operation button group (not shown) displayed on display unit 210, for example, the operation is notified by operation accepting unit 260 to letter image data display control unit 220.

When the system of the present invention is employed, generally, the operator gazes first display area 211 to check whether a false recognition result of letter image data is included in unit images 213 being displayed. In second display area 212a, unit image sets 213a are smoothly scrolled from the lower part of display unit 210 toward first display area 211. The operator is aware of unit image sets 213a in second display area 212a viewed with peripheral vision, to detect inclusion of the false recognition result (inclusion of foreign matter).

Letter image data display control unit 220 causes unit image set 213a to be scrolled from second display area 212a to first display area 211. After unit image set 213a is stood still for a given period of time on first display area 211, it is scrolled toward second display area 212b. The operator gazes (with central vision) first display area 211 to carry out detailed visual inspection to see whether unit images 213 displayed include any false recognition result of the letter image data.

Thereafter, unit image set 213a is scrolled from first display area 211 to second display area 212b. Unit image set 213a scrolled from first display area 211 smoothly moves toward the upper part of display unit 210 until it disappears at the top of display unit 210. The operator is aware of unit image sets 213a in second display area 212b viewed with peripheral vision, to reconfirm that no false recognition result is included therein.

When the operator finds the false recognition result, he/she performs a scroll stop operation, which is followed by input of a correct recognition result, or marking of unit image 213 including the false recognition result using the mouse or the like (for example, the background color of relevant unit image 213 or the color of the letter image data in relevant unit image 213 is changed). The false recognition results thus marked may be gathered to make the correction using the method disclosed in Patent Document 1 described above.

The above-described operation is repeated while unit images 213 of new letter image data are scrolled in series to be subjected to visual inspection.

As explained above, the operator mainly performs (1) detailed visual inspection in first display area 211 with central vision, while auxiliarily performing (2) visual inspection in second display area 212a with peripheral vision and (3) visual inspection in second display area 212b with peripheral vision. By carrying out these main and auxiliary visual inspections (1) through (3) simultaneously, the operator is hardly required to move the line of sight, and thus, the load of the operator can be reduced to a minimum, while omission (i.e., those missed or skipped) in the inspection can considerably be decreased.

The use of the system of the present invention allows the operator to carry out flexible visual inspection as follows:

(Pattern 1) When there is enough job allowance with respect to the inspection speed, the operator can proactively work on the inspection of (1) above, for effective use of the visual inspection with peripheral vision.

(Pattern 2) When the operator determines that detailed inspection needs to be performed during the inspection of (2) above, the operator may carry out the visual inspection, paying no attention to the inspections of (1) and (3).

(Pattern 3) When the operator determines that the inspection of (2) above cannot be performed sufficiently, he/she can focus on the inspection of (3) above to effectively utilize the visual inspection with peripheral vision. If the operator determines that focusing on the inspection of (3) above is not enough to complete the thorough visual inspection, then he/she can perform a key operation or the like to reduce the scrolling speed of unit images 213, or stop or reverse the scroll.

Further, in the system of the present invention, the scrolling speed of unit images 213 may be changed depending on the skill of the operator.

Figure 4:
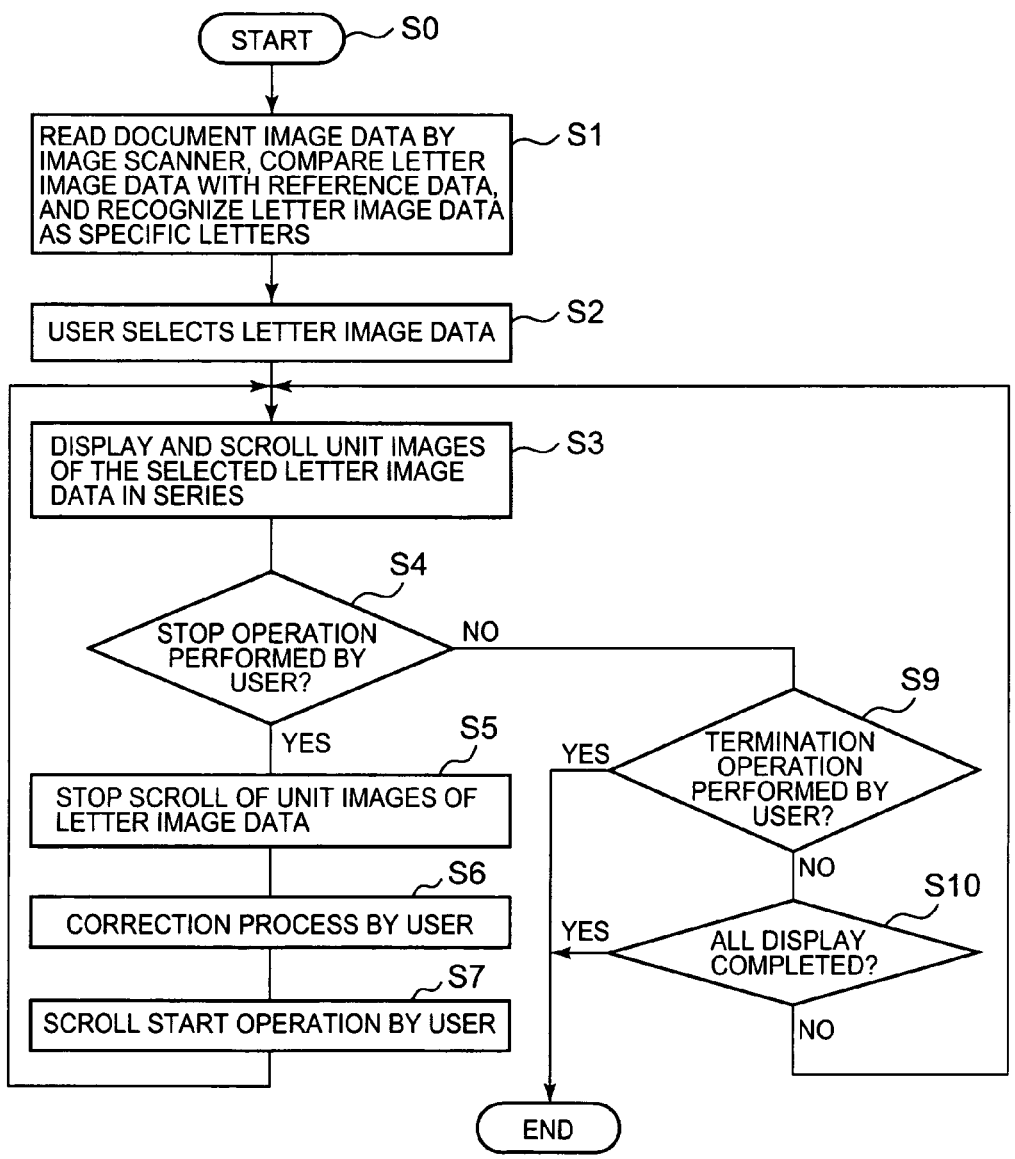
FIG. 4 is a flowchart illustrating an operation of the system according to the embodiment of the present invention.

Reference is now made to FIG. 4. FIG. 4 is a flowchart showing an operation of the system of the present invention. Firstly, document image data is read with the image scanner, the letter image data are compared with reference data, and the letter image data are recognized as specific letters (step S1). These operations are carried out by document image data storage unit 230, letter image data recognition unit 240, and letter image data storage unit 250. The user selects letter image data to be inspected (step S2). For example, the operator has selected "8" in FIG. 3. Next, unit images 213 of the selected letter image data are displayed and scrolled on second display area 212*a*, first display area 211, and second display area 212*b* in series by letter image data display control unit 220 (step S3). Here, it is determined whether the user has performed a stop operation (step S4). If not, the process proceeds to step S9. If the stop operation has been performed, the scroll of unit images 213 is stopped (step S5). Next, the correction process of the false recognition result is performed by the user (step S6). After the correction process, when the user performs a scroll start operation (step S7), the process returns to step S3. In step S9, it is determined whether a termination operation has been performed by the user. If so, the visual inspection is finished (step S8). If the termination operation is not performed, it is determined whether the display of all the unit images of the selected letter image data has been completed (step S10). If so, the visual inspection is finished (step S8). Otherwise, the process returns to step S3. By performing this flow for all the reference data, it is possible to realize the visual inspection with nothing missed or skipped during the inspection.

As described above, according to the present invention, the operator casts his/her eye on the "gaze area" and effectively uses the peripheral vision. This can restrict the movement of the operator's line of sight to a minimum, so that it is possible to considerably reduce the omission in the inspection while reducing the load of the operator.

Figure 6:
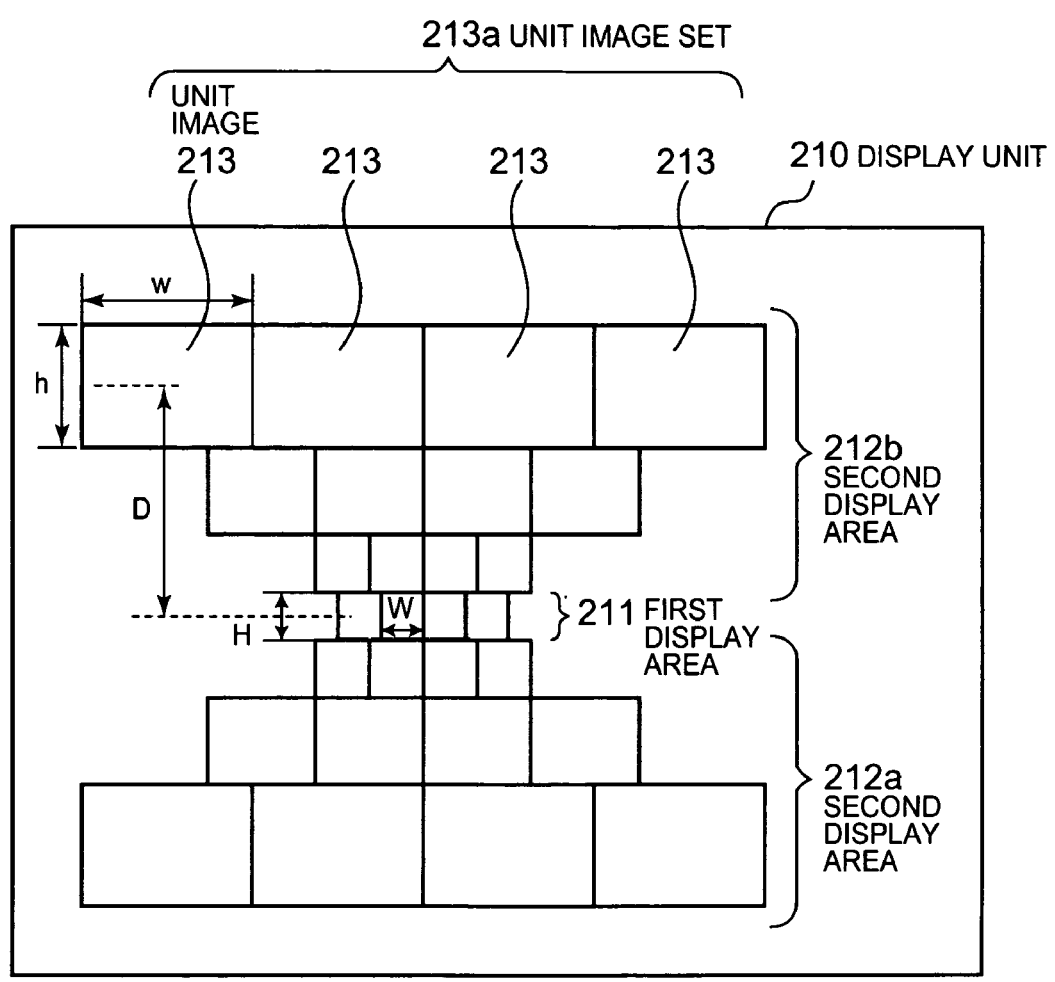
FIG. 6 is a display example of display unit 210 in the system and display method according to the embodiment of the present invention.

Reference is now made to FIG. 6. FIG. 6 shows a display example of display unit 210 in the inventive system according to the present embodiment. In the present embodiment, the size of unit images 213 in second display areas 212*a* and 212*b* has the correlation with the distance from the center of first display area 211 (distance from the center of the unit images in first display area 211) and with the width of the unit image in first display area 211. Specifically, in the present embodiment, when the distance from the center of unit images 213 in second display areas 212*a* and 212*b* (in FIG. 6, unit image 213 on the uppermost left side of second display area 212*b* is used for explanation) to the center of the unit images in first display area 211 is represented as D, and the width of unit image 213 in first display area 211 is represented as W, then the height h and the width w of unit images 213 in the second display area satisfy the following Expression 1 through Expression 3. That is, all the unit images 213 in second display areas 212*a* and 212*b* satisfy Expression 1 through Expression 3 as follows.

$$h=(1+a \times D) \times H + c \quad \text{(Expression 1)}$$

$$w=(1+b \times D) \times W + d \quad \text{(Expression 2)}$$

$$w=(1+b \times D^2) \times W + d \quad \text{(Expression 3)}$$

In the above Expressions, a, b, c and d are parameters for adjustment, which may be set as appropriate. Width w of the particular unit image 213 in the second display area may be set to satisfy Expression 2 or Expression 3. It is noted that D in Expression 1 may be a visual angle between the center of the visual field (center of the first display area) and the unit image set. In the system and method of the present invention, the expressions for determining the size of the unit images are not limited to Expression 1 through Expression 3 above.

When height h and width w of unit images 213 in the second display area satisfy Expression 1 through Expression 3 as in the present embodiment, in second display areas 212*a* and 212*b*, the enlargement factor increases as the distance from first display region 211 increases, so that the visual inspection with peripheral vision can be carried out more effectively.

In the present embodiment, the case where four unit images 213 are arranged side by side in the lateral direction has been explained. Not limited thereto, at least one and preferably at most four unit images may be arranged side by side as appropriate. Further, in the present embodiment, the case where unit images 213 are scrolled in the longitudinal direction has been explained. Not limited thereto, it is of course possible to cause unit images 213 to be scrolled in the lateral direction.

Figure 7:
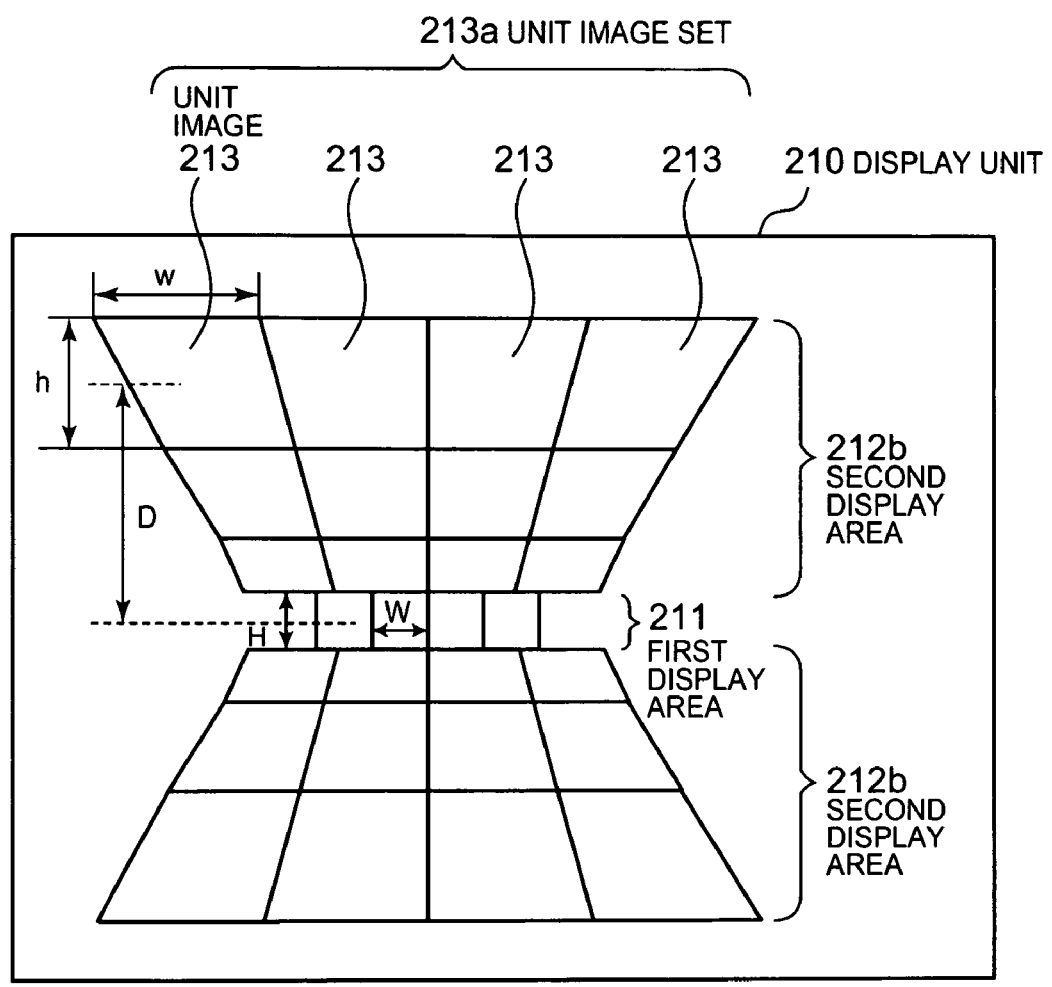
FIG. 7 is a display example of display unit 210 in the system and display method according to the embodiment of the present invention.

Reference is now made to FIG. 7. FIG. 7 shows a display example of display unit 210 in the inventive system of the present embodiment. In the example shown in FIG. 7, it is configured in the system and method of the present invention such that w in Expression 1 above represents the width of each lateral scanning line in the unit image set, and D represents the distance from the center line in the vertical direction of the first display region to each lateral scanning line in the unit image set. Thus, by satisfying (Expression 1), it is possible to cause the enlargement factor in the lateral direction to be increased for each lateral scanning line as the angle to the center of the visual field increases.

In FIG. 3, first display region 211 is arranged in close proximity to each of second display regions 212*a* and 212*b*. Not limited thereto, it may be made so that a part of first display region 211 and a part of second display region 212*a* overlap each other, and a part of first display region 211 and a part of second display region 212*b* overlap each other. Still alternatively, first display region 211 and second display region 212*a*, and first display region 211 and second display region 212*b* may be continuous at their boundaries.

Further, it is effective to differentiate the background color of the letter image data in unit images 213 in first display region 211 from that in second display regions 212*a* and 212*b*, since there exists a color (for example, yellow or blue) that facilitates peripheral vision of the operator. For example, setting the background color of the letter image data in unit images 213 in first display region 211 to be white and setting the background color of the letter image data in unit images 213 in second display regions 212*a* and 212*b* to be yellow or blue can facilitate the operator's peripheral vision, thereby improving accuracy of the visual inspection with peripheral vision.

As explained above in detail, according to the present invention, the operator sees the second display region with peripheral vision while watching the first display region, which enables look-ahead and/or follow-up (or reconfirmation) of the results of inspection. Further, even when the operator cannot follow the inspection speed in the first display region, he/she can perform follow-up inspection with peripheral vision in the second display region. The fact that the look-ahead and/or follow-up (or reconfirmation) inspection can be conducted provides the operator with enough job allowance for work. Further, according to the present invention, the movement of the operator's line of sight can be restricted to a minimum, which can reduce strain on his/her eyes.

EXAMPLE 1

In the present embodiment, description will be made about another example of display method of the first and second display regions in the system and display method of the present invention. The other components are identical to those described in the above embodiment, and thus, description thereof will not be repeated here.

Figure 8:
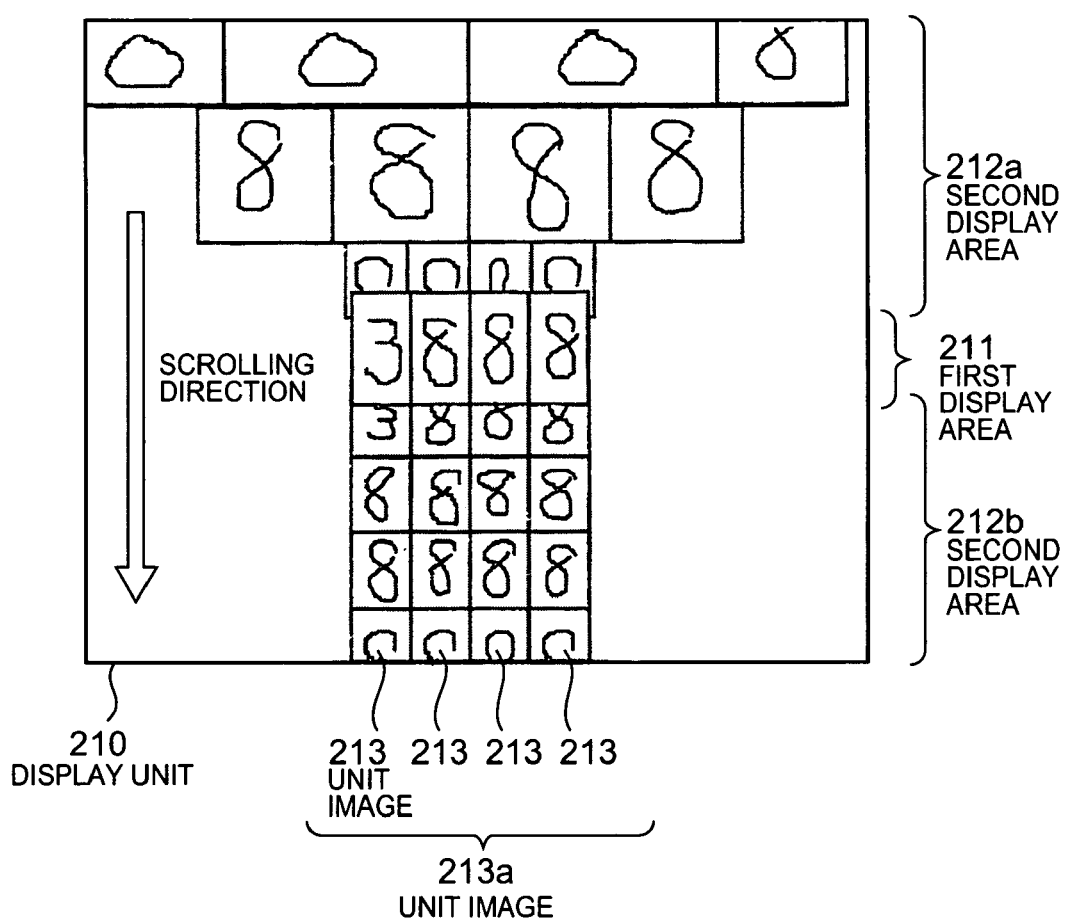
FIG. 8 is a display example of display unit 210 in the system and display method according to the embodiment of the present invention.

Reference is made to FIG. 8. FIG. 8 shows a display example of display unit 210 according to the inventive system and display method of the present embodiment. In the present example as well, first display region 211 and second display regions 212a and 212b are displayed on display unit 210, as in the above-described embodiment. In the present example, of the two second display regions, second display region 212a is the region where unit images 213 scrolled from the upper part of display unit 210 toward first display region 211 are displayed, and the other second display region 212b is the region where unit images 213 scrolled from first display region 211 toward the lower part of display unit 210 are displayed.

Although unit images 213 are scrolled from the upper part to the lower part of the display unit in the present example, the scrolling direction may be reversed. Further, in the system of the present example, the display format of unit images 213 in first display region 211 is differentiated from the display format of unit images 213 in second display regions 212a and 212b. Specifically, as shown in FIG. 8, in second display region 212a, unit images 213 increase in size as the distance from first display region 211 increases. In other words, in second display region 212a, unit images 213 decrease in size (the enlargement factor of unit images 213 decreases) as they are scrolled from the upper part of display unit 210 toward first display region 211. In second display region 212b, the size of unit images 213 remains unchanged while they are scrolled from first display region 211 toward the lower part of display unit 210. Although the case of four unit images 213 arranged side by side in the lateral direction is explained in the present example, not limited thereto, at least one and preferably at most four unit images may be arranged side by side as appropriate.

In FIG. 8, part of first display region 211 and part of second display region 212a, and part of first display region 211 and part of second display region 212b are made to overlap each other. However, not limited thereto, first display region 211 may be in close proximity to each of second display regions 212a and 212b. Still alternatively, first display region 211 and second display region 212a, and first display region 211 and second display region 212b may be continuous at their boundaries.

As described above, according to the system of the present example, unit images 213 in second display region 212a are made greater in size than unit images 213 in first display region 211. This allows the operator to be aware of unit image sets 213a in second display region 212a viewed with peripheral vision, to detect inclusion of a false recognition result (inclusion of foreign matter) prior to the detailed visual inspection in first display region 211.

In the present example as well, as in the above-described embodiment, it is effective to differentiate the background color of the letter image data of unit images 213 in first display region 211 from the background color of the letter image data of unit images 213 in second display regions 212a and 212b. For example, when the background color of the letter image data of unit images 213 is made to be white in first display region 211 while it is made to be yellow or blue in second display regions 212a and 212b, the operator's peripheral vision in second display region 212a is facilitated, and thus, the accuracy of the visual inspection with peripheral vision improves.

As described above, the present invention in accordance with the present example allows the operator to look ahead the inspection results by seeing the second display region with peripheral vision while gazing the first display region. The fact that the look-ahead inspection can be performed provides the operator with enough job allowance for work. In addition, according to the present invention, the movement of the operator's line of sight can be reduced to a minimum, which can reduce strain on his/her eyes.

In the system and method of the present example as well, the processing of the unit images may be carried out so as to satisfy the above-described embodiment as well as Expression 1 through Expression 3 described in conjunction with FIGS. 6 and 7.

EXAMPLE 2

In the present example, description will be made about another example of display method of the first and second display regions in the system and display method of the present invention. The other components are identical to those in the above-described embodiment, and thus, description thereof will not be repeated here.

Figure 9:
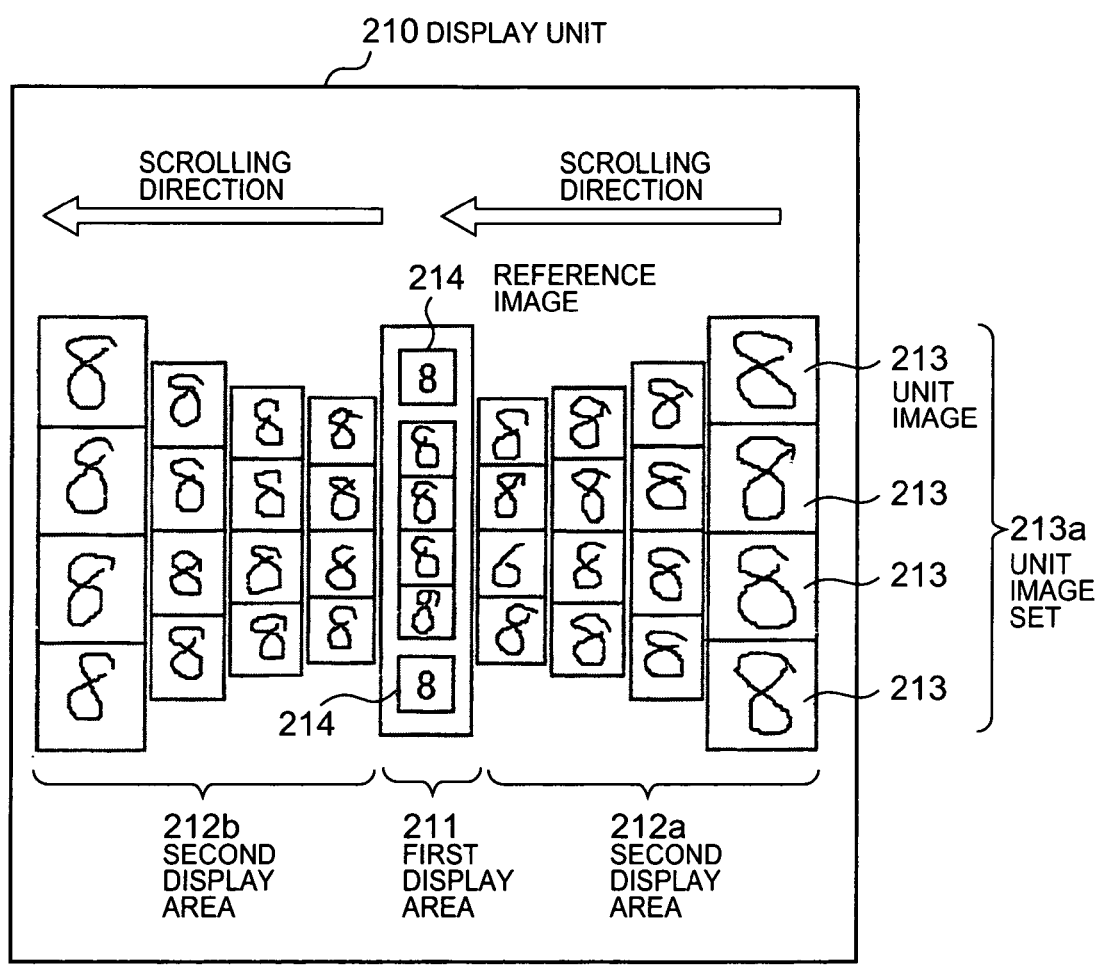
FIG. 9 is a display example of display unit 210 in the system and display method according to the embodiment of the present invention.

Reference is made to FIG. 9. FIG. 9 shows a display example of display unit 210 in the inventive system and display method according to the present example. In the present example as well, first display region 211 and second display regions 212a and 212b are displayed on display unit 210, as in the above-described embodiment. In the present example, unlike the embodiment described above, unit images 213 are scrolled in a lateral direction. Although the case of arranging four unit images 213 in a longitudinal direction is explained in the present example, at least one and preferably at most four unit images may be arranged as appropriate.

In the present example, unit images 213 are scrolled from the right part to the left part of the display unit, although the scrolling direction may be reversed. Further, in the system of the present example, the display format of unit images 213 in first display region 211 differs from that in second display regions 212a and 212b. Specifically, as shown in FIG. 9, the size of unit images 213 increases in second display regions 212a and 212b as the distance from first display region 211 increases. In other words, in second display region 212a, the size of unit images 213 decreases (the enlargement factor of unit images 213 decreases) as they are scrolled from the right part of display unit 210 toward first display region 211, while in second display region 212b, the size of unit images 213 increases (the enlargement factor of unit images 213 increases) as they are scrolled from first display region 211 toward the left part of display unit 210.

In the system of the present invention, the operator is allowed to perform visual inspection of unit images 213 in first display region 211 by gazing first display region 211, and further to perform visual inspection of unit images 213 in second display regions 212a and 212b with peripheral vision.

Although first display region 211 is in close proximity to each of second display regions 212a and 212b in FIG. 9, not limited thereto, part of first display region 211 and part of second display region 212a, and part of first display region 211 and part of second display region 212b may be made to overlap each other. Still alternatively, first display region 211 and second display region 212a, and first display region 211 and second display region 212b may be continuous at their boundaries.

As such, in the system of the present example, unit images 213 in second display regions 212a and 212b are greater in size than those in first display region 211, so that the operator can detect inclusion of the false recognition results (inclusion of foreign matters) before and after the detailed visual investigation in first display region 211 by being aware of unit image sets 213a in second display regions 212a and 212b viewed with peripheral vision.

In the present example as well, as in the above-described embodiment, it is effective to differentiate the background color of the letter image data of unit images 213 in first display region 211 from the background color of the letter image data of unit images 213 in second display regions 212a and 212b. For example, when the background color of the letter image data of unit images 213 is made to be white in first display region 211 while it is made to be yellow or blue in second display regions 212a and 212b, the operator's peripheral vision in second display regions 212a and 212b is facilitated, and thus, the accuracy of the visual inspection with peripheral vision improves.

As described above in detail, with the present invention according to the present example, the operator can look ahead and/or follow up (or reconfirm) the inspection results by viewing the second display region with peripheral vision while gazing the first display region. If the operator cannot follow the inspection speed in the first display region, he/she can perform the follow-up inspection with peripheral vision in the second display region. The fact that the look-ahead and/or follow-up (or reconfirmation) inspection can be conducted provides the operator with enough a job allowance for work. Further, according to the present invention, the movement of the operator's line of sight can be reduced to a minimum, which can reduce strain on his/her eyes.

Figure 10:
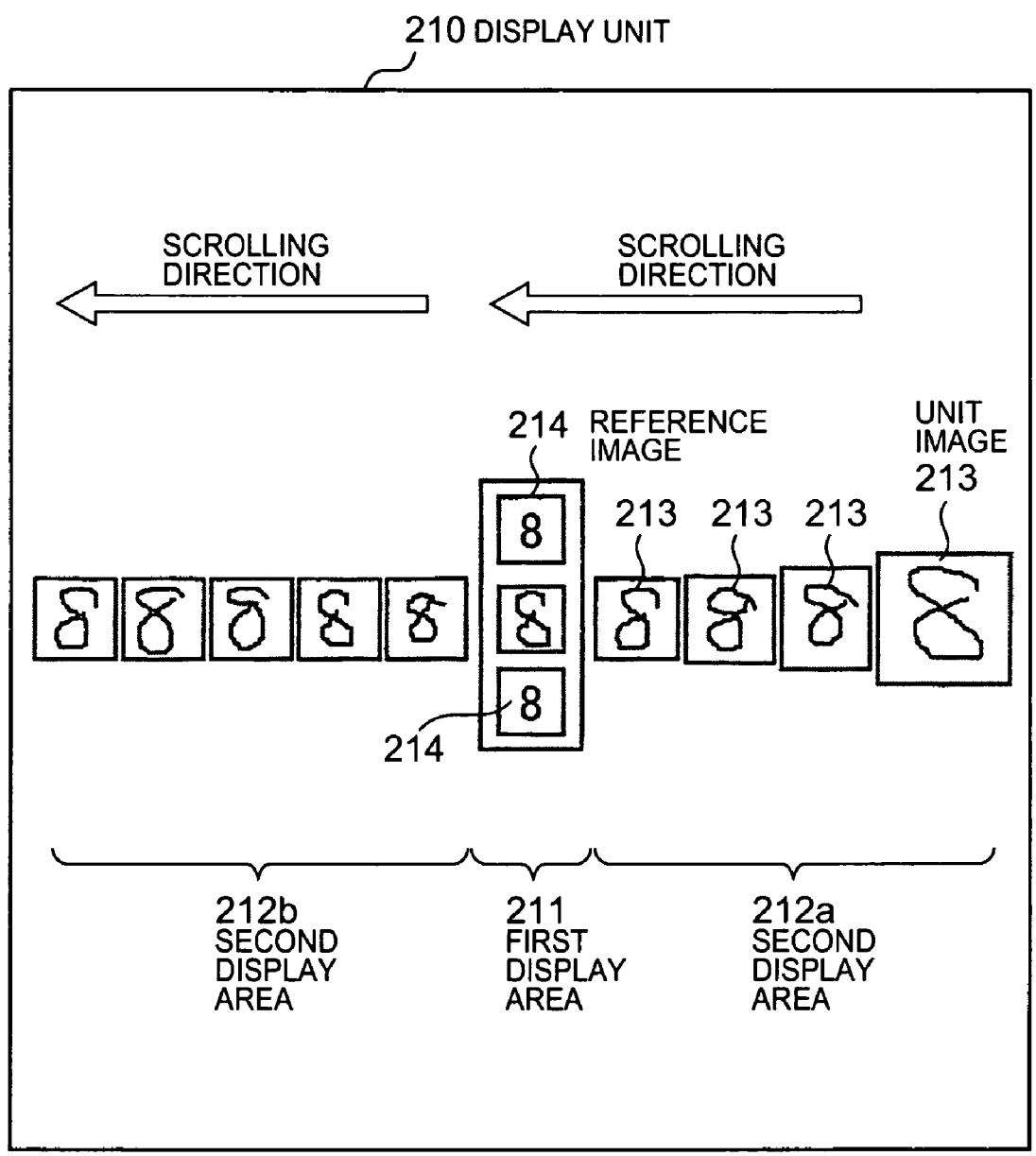
FIG. 10 is a display example of display unit 210 in the system and display method according to the embodiment of the present invention.

Further, as shown in FIG. 10, the display format of unit images 213 in second display region 212a may be differentiated from that of unit images 213 in second display region 212b. In the example shown in FIG. 10, in second display region 212a, the size of unit images 213 decreases (the enlargement factor of unit images 213 decreases) as they are scrolled from the right part of display unit 210 toward first display region 211. In second display region 212b, the size of unit images 213 remains unchanged even as they are scrolled from first display region 211 toward the left part of display unit 210. In the example shown in FIG. 10 as well, the operator can look ahead the inspection results in second display region 212a with peripheral vision while gazing first display region 211. The fact that the look-ahead inspection can be performed provides the operator with enough job allowance for work. Further, according to the present invention, the movement of the operator's line of sight can be reduced to a minimum, which reduces strain on the eyes.

In the case where the unit images are scrolled in the lateral direction as in the present example as well, the unit images may be processed so as to satisfy the above-described embodiment as well as Expression 1 through Expression 3 described in conjunction with FIGS. 6 and 7. In this case, the conditions satisfying Expression 1 through Expression 3 may be employed in the state where FIGS. 6 and 7 are rotated by 90 degrees. In the present example as well, the expressions for determination of the size of the unit images are not limited to Expression 1 through Expression 3.

EXAMPLE 3

In the system and display method of the present invention, it is preferable that the enlargement factor of the unit image at respective positions in the second display region is determined in correlation with the degree of attenuation of vision for the angle (visual angle) from the center of the visual field of the image. Therefore, differentiating the enlargement factor of each unit image in the second display region in accordance with the visual angle in its position, and making the unit image set curved or making each of the unit images deformed such that the visual angle becomes equal in any position of the unit images in the same unit image set, are within the scope of the present invention.

Further, the enlargement factor and deformation of the unit images described above may be regarded as the enlargement factor and deformation of further segmented regions of the unit images.

Figure 11:
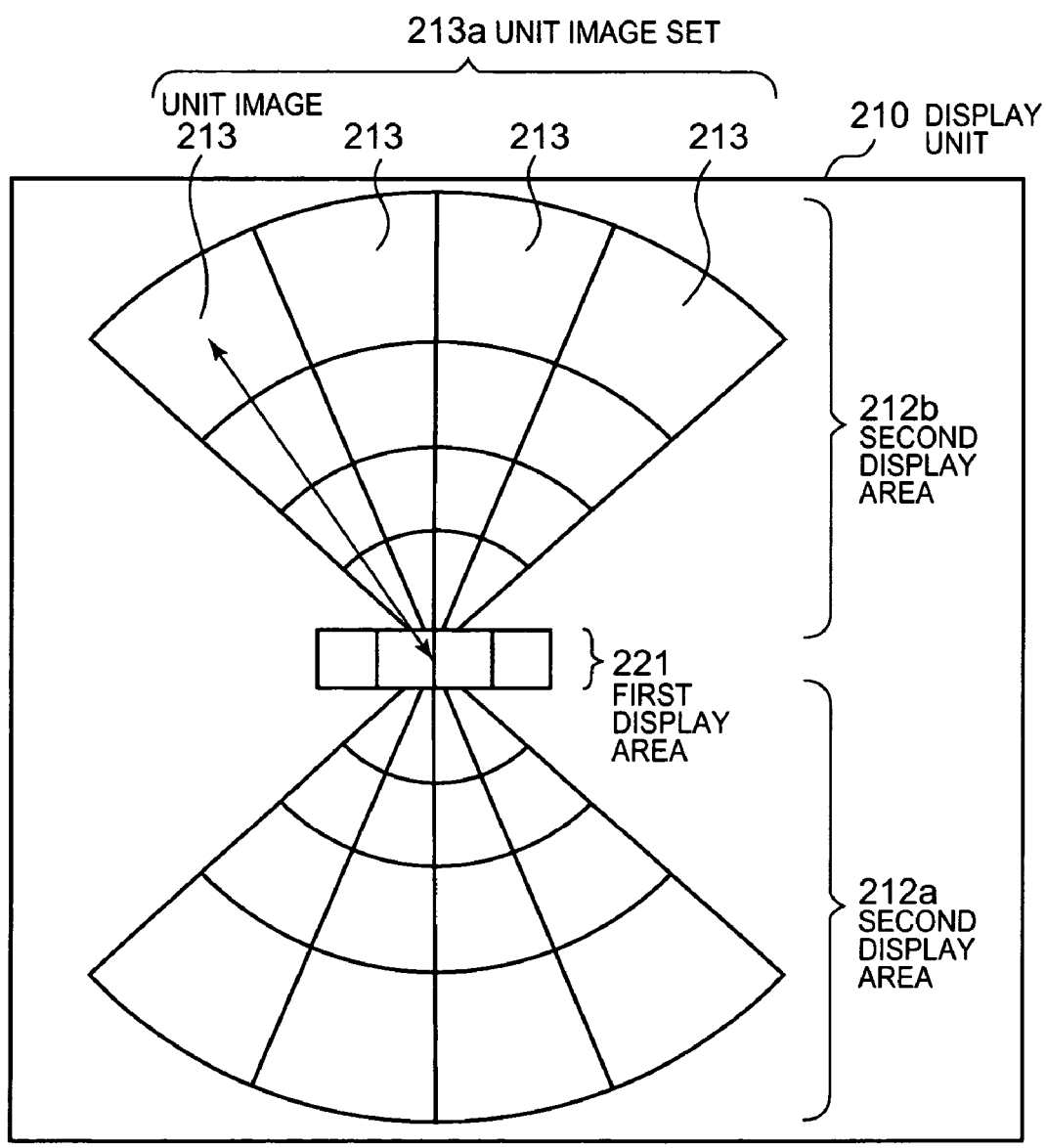
FIG. 11 is a display example of display unit 210 in the system and display method according to the embodiment of the present invention.

Reference is now made to FIG. 11. FIG. 11 shows a display example of display unit 210 in the inventive display system according to the present example. In the present example, the shapes of unit images 213 in second display regions 212a and 212b are deformed to satisfy Expression 1 through Expression 3 using the method explained in the embodiment above, and in addition, they are deformed on the basis of the distance from the central point of first display region 211. In doing so, unit images 213 in each of second display regions 212a and 212b have a fan-like form as shown in FIG. 11.

With such processing, in each of second display regions 212a and 212b, unit images 213 are arranged in the fan shape, and the enlargement factor increases as the distance from first display region 211 increases, so that the visual inspection with peripheral vision can be performed more effectively.

Figure 12:
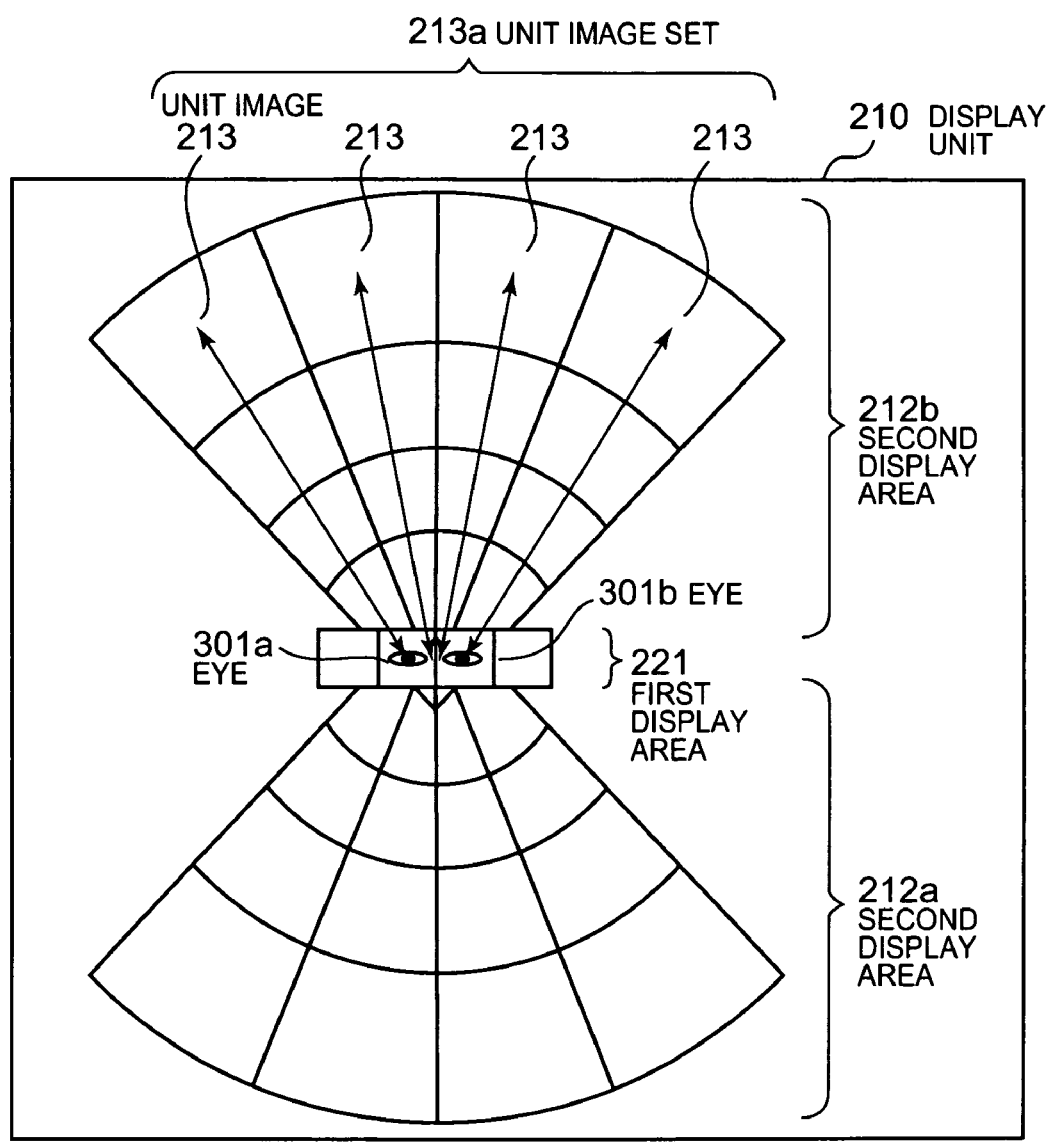
FIG. 12 is a display example of display unit 210 in the system and display method according to the embodiment of the present invention.

Reference is now made to FIG. 12. FIG. 12 shows another display example of display unit 210 in the inventive display system according to the present example. In the present example, the shapes of unit images 213 in second display regions 212a and 212b are deformed to satisfy Expression 1 through Expression 3 using the method explained in the embodiment above, and additionally, they are deformed on the basis of the distance from each of the central points of the operator's eyes 301a and 301b viewing first display region 211. As a result, unit images 213 in each of second display regions 212a and 212b have a fan-like form or a trapezoidal form.

With such processing, in each of second display regions 212a and 212b, unit images 213 are arranged in the fan shape or the trapezoidal shape, and the enlargement factor increases as the distance from first display region 211 increases, so that the visual inspection with peripheral vision can be performed more effectively.

Although the case where four unit images 213 are arranged side by side in the lateral direction is explained in the present example, not limited thereto, at least one and preferably at most four unit images may be arranged as appropriate. Further, although the case where unit images 213 are scrolled in the longitudinal direction is explained in the present example, it is of course possible to scroll unit images 213 in the lateral direction.

In the system and display method of the present invention, a plurality of display regions including first and second display regions are provided, and the operator can look ahead and/or follow up (or reconfirm) the inspection results in the second display region with peripheral vision while gazing the first display region. Further, even if the operator cannot follow the inspection speed in the first display region, he/she can perform the follow-up inspection with peripheral vision in the second display region. The fact that the look-ahead and/or follow-up (or reconfirmation) inspection can be performed provides the operator with enough job allowance for work. Further, according to the present invention, the movement of the operator's line of sight can be reduced to a minimum, which can reduce strain on the eyes.

Figure 13:
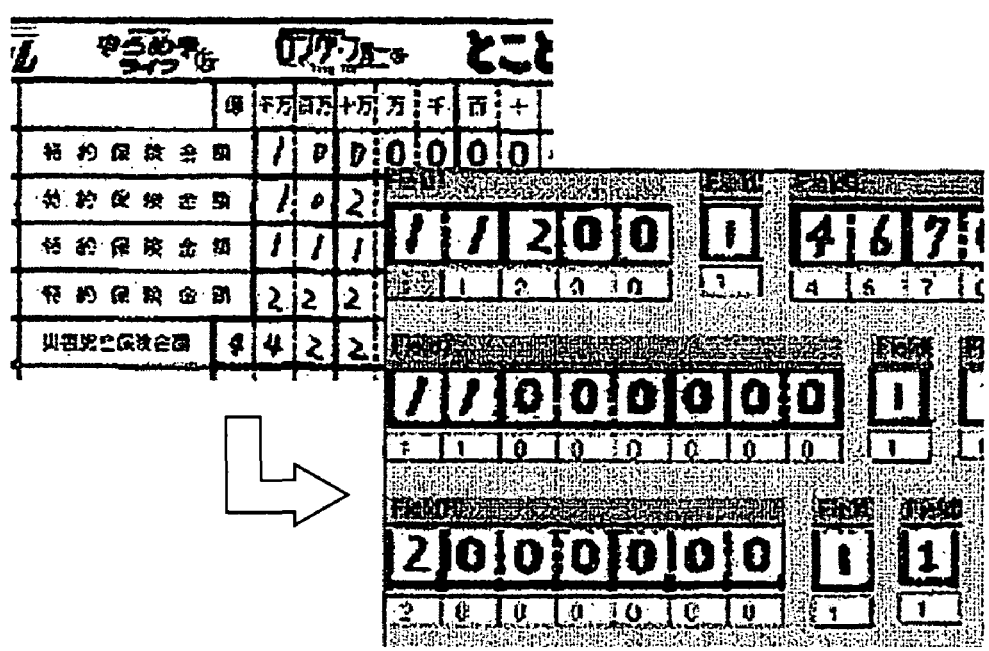
FIG. 13 shows an application example of the display system and display method according to the embodiment of the present invention.
Figure 14:
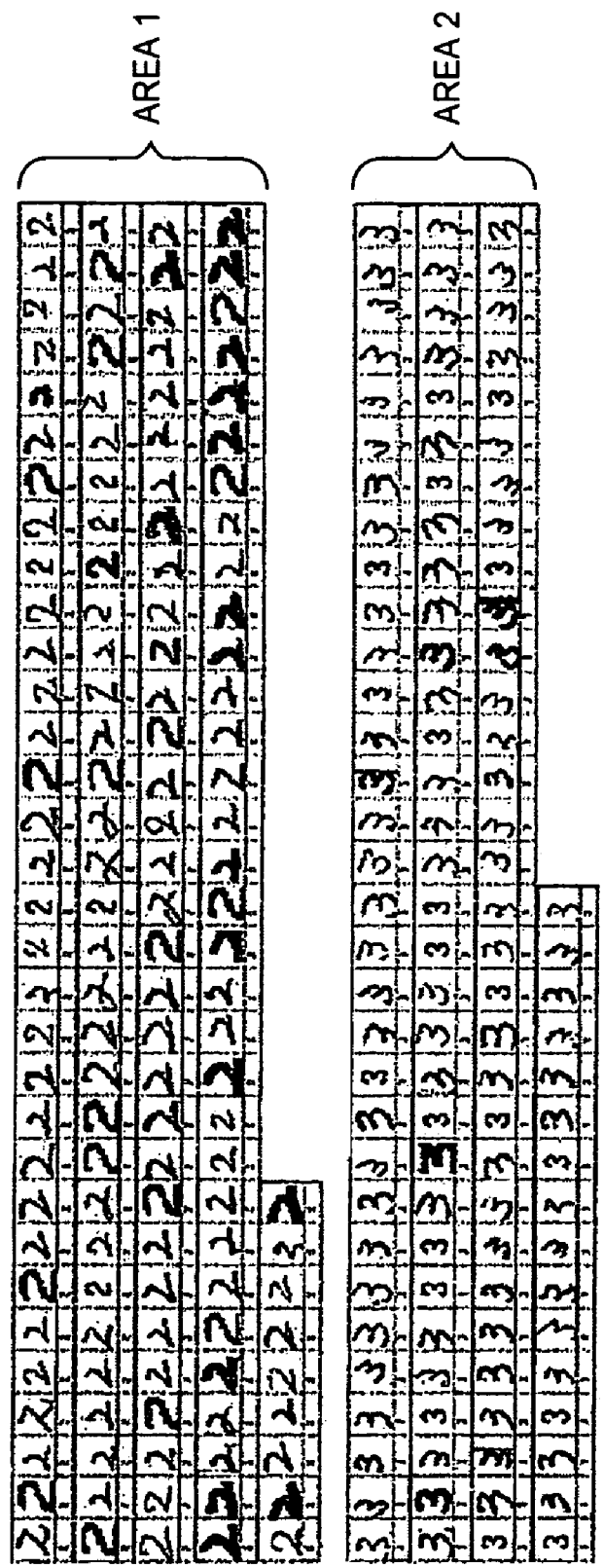
FIG. 14 shows a conventional method of visual inspection.
Figure 15:
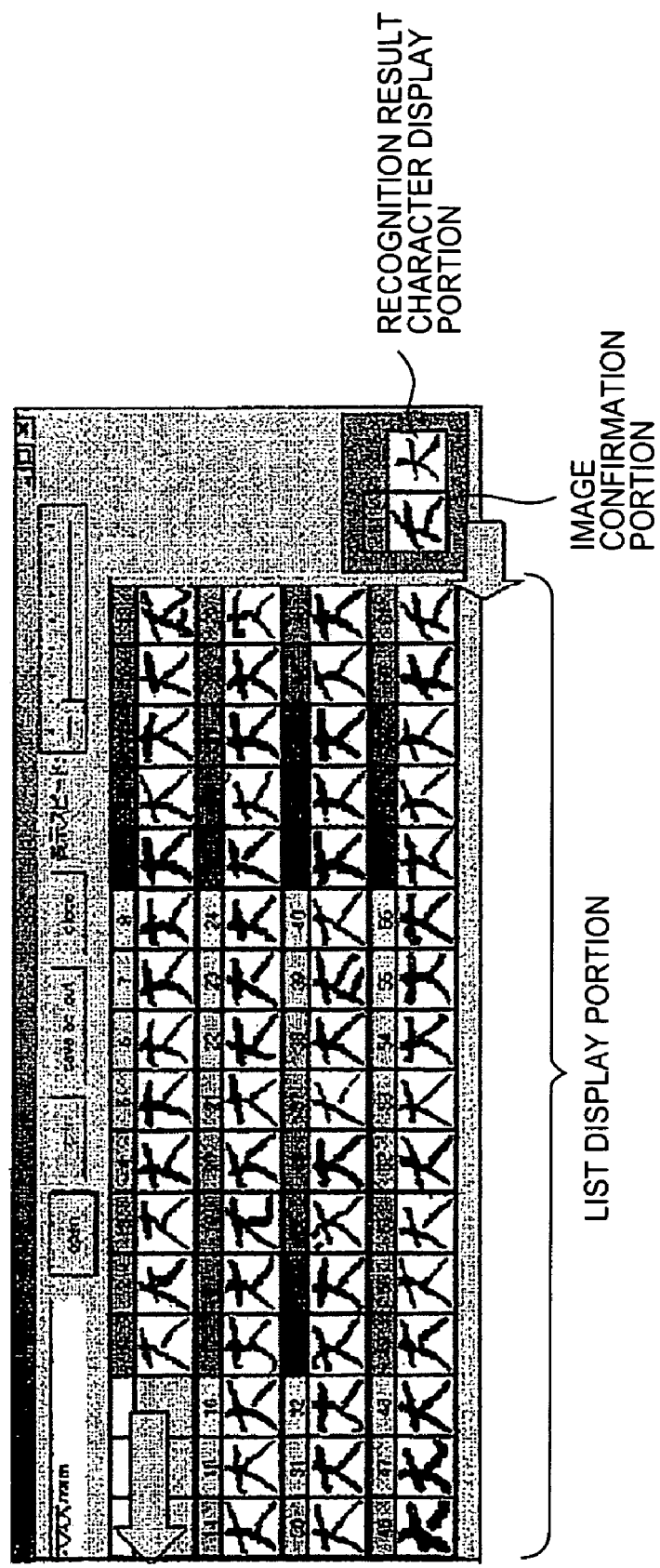
FIG. 15 shows another conventional method of visual inspection.

Accordingly, the present invention is effective in an inspection system that requires visual inspection by a human being after processing by a computer, as in the case of the visual inspection of the recognition results of a large amount of image data when data entry sheets as shown in FIG. 13 are subjected to OCR processing.

The invention claimed is:
1. A computer-implemented method of inspecting characters of a document interpreted by an optical character reading (OCR) process, the method comprising:
 displaying a first document character image in a gaze area of a display screen;
 displaying a reference character in a reference display area of the display screen, the reference character corresponding to the first document character, as interpreted by the OCR process, and the first document character image corresponds to a first document character in the document;

displaying a second document character image in a first inspection area of the display screen, the first inspection area being adjacent a first side of the gaze area; and displaying a third document character image in a second inspection area of the display screen, the second inspection area being adjacent a second side of the gaze area opposite the first side, wherein the second and the third document character images, respectively, correspond to a second and a third document characters in the document, and the reference character corresponding to the second and the third document characters, as interpreted by the OCR process.

2. The computer-implemented method of inspecting characters of claim 1 further comprising:

displaying a first group of collinear document character images in the gaze area, the first group of collinear document characters including the first document character image;

displaying a second group of collinear document character images in the first inspection area, the second group of collinear document characters including the second document character image; and displaying a third group of collinear document character images in the second inspection area, the third group of collinear document characters including the third document character image.

3. The computer-implemented method of inspecting characters of claim 2, further comprising:

scrolling the display screen in a direction from the first inspection area towards the second inspection area, wherein the second group of collinear document character images moves into the gaze area displacing the first group of collinear document character images, and the first group of collinear document character images moves into the second inspection area displacing the third group of collinear document character images.

4. The computer-implemented method of inspecting characters of claim 2, further comprising:

displaying a fourth group of collinear document character images in the first inspection area, the fourth group of collinear document character images being visually longer than the second group of collinear document character images; and displaying a fifth group of collinear document character images in the second inspection area, the fifth group of collinear document character images being visually longer than the third group of collinear document character images.

5. The computer-implemented method of inspecting characters of claim 4, further comprising;

scrolling the display screen in a direction from the first inspection area towards the second inspection area, wherein the fourth group of collinear document character images displaces the second group of collinear document character images, the second group of collinear document character images moves into the gaze area displacing the first group of collinear document character images, the first group of collinear document character images moves into the second inspection area displacing the third group of collinear document character images, and the third group of collinear document character images displaces the fifth group of collinear document character images.

6. A computer implementable method of inspecting characters of a document interpreted by an optical character reading process, the method comprising:

displaying a first document character in a gaze area of a display screen;

displaying a reference character in a reference display area of the display screen, the reference character corresponding to the first document character as interpreted by an optical character reading process;

displaying a second document character in a first inspection area of the display screen, the first inspection area being adjacent a first side of the gaze area;

displaying a third document character in a second inspection area of the display screen, the second inspection area being adjacent a second side of the gaze area; and scrolling the display screen in a direction from the first inspection area towards the second inspection area, wherein the second document character moves into the gaze area and the first document character moves into the second inspection area.

7. A computer-readable medium encoded with computer executable instructions configured for:

displaying a first document character image in a gaze area of a display screen;

displaying a reference character in a reference display area of the display screen, the reference character corresponding to the first document character as interpreted by an optical character reading (OCR) process, and the first document character image corresponds to a first document character in a document;

displaying a second document character image in a first inspection area of the display screen, the first inspection area being adjacent a first side of the gaze area; and displaying a third document character image in a second inspection area of the display screen, the second inspection area being adjacent a second side of the gaze area opposite the first side, wherein the second and the third document character images, respectively, correspond to a second and a third document characters in the document, and the reference character corresponding to the second and the third document characters, as interpreted by the OCR process.

8. The computer-readable medium of claim 7, further comprising:

scrolling the display screen in a direction from the first inspection area towards the second inspection area, wherein the second document character image moves into the gaze area and the first document character image moves into the second inspection area.

9. The computer-readable medium of claim 7, further comprising:

displaying a first group of collinear document character images in the gaze area, the first group of collinear document characters including the first document character image;

displaying a second group of collinear document character images in the first inspection area, the second group of collinear document characters including the second document character image; and displaying a third group of collinear document character images in the second inspection area, the third group of collinear document characters including the third document character image.

10. The computer-readable medium of claim 9, further comprising:
   scrolling the display screen in a direction from the first inspection area towards the second inspection area, wherein
   the second group of collinear document character images moves into the gaze area displacing the first group of collinear document character images, and
   the first group of collinear document character images moves into the second inspection area displacing the third group of collinear document character images.

11. The computer-readable medium of claim 9, further comprising:
   displaying a fourth group of collinear document character images in the first inspection area, the fourth group of collinear document character images being visually longer than the second group of collinear document character images; and
   displaying a fifth group of collinear document character images in the second inspection area, the fifth group of collinear document character images being visually longer than the third group of collinear document character images.

12. The computer-readable medium of claim 9, further comprising:
   scrolling the display screen in a direction from the first inspection area towards the second inspection area, wherein
   the fourth group of collinear document character images displaces the second group of collinear document character images,
   the second group of collinear document character images moves into the gaze area displacing the first group of collinear document character images,
   the first group of collinear document character images moves into the second inspection area displacing the third group of collinear document character images, and
   the third group of collinear document character images displaces the fifth group of collinear document character images.

13. A system comprising:
   a processor;
   a data bus coupled to the processor;
   a computer computer-readable medium encoded with computer executable instructions configured for:
   displaying a first document character image in a gaze area of a display screen;
   displaying a reference character in a reference display area of the display screen, the reference character corresponding to the first document character as interpreted by an optical character reading (OCR) process, and the first document character image corresponds to a first document character in a document;
   displaying a second document character image in a first inspection area of the display screen, the first inspection area being adjacent a first side of the gaze area; and
   displaying a third document character image in a second inspection area of the display screen, the second inspection area being adjacent a second side of the gaze area opposite the first side, wherein
   the second and the third document character images, respectively, correspond to a second and a third document characters in the document, and
   the reference character corresponding to the second and the third document characters, as interpreted by the OCR process.

14. The system of claim 13, wherein the computer executable instructions are further configured for:
   scrolling the display screen in a direction from the first inspection area towards the second inspection area, wherein
   the second document character image moves into the gaze area and the first document character image moves into the second inspection area.

15. The system of claim 13, wherein the computer executable instructions are further configured for:
   displaying a first group of collinear document character images in the gaze area, the first group of collinear document characters including the first document character image;
   displaying a second group of collinear document character images in the first inspection area, the second group of collinear document characters including the second document character image; and
   displaying a third group of collinear document character images in the second inspection area, the third group of collinear document characters including the third document character image.

16. The system of claim 15, wherein the computer executable instructions are further configured for:
   scrolling the display screen in a direction from the first inspection area towards the second inspection area, wherein
   the second group of collinear document character images moves into the gaze area displacing the first group of collinear document character images, and
   the first group of collinear document character images moves into the second inspection area displacing the third group of collinear document character images.

17. The system of claim 15, wherein the computer executable instructions are further configured for:
   displaying a fourth group of collinear document character images in the first inspection area, the fourth group of collinear document character images being visually longer than the second group of collinear document character images; and
   displaying a fifth group of collinear document character images in the second inspection area, the fifth group of collinear document character images being visually longer than the third group of collinear document character images.

18. The system of claim 17, wherein the computer executable instructions are further configured for:
   scrolling the display screen in a direction from the first inspection area towards the second inspection area, wherein
   the fourth group of collinear document character images displaces the second group of collinear document character images,
   the second group of collinear document character images moves into the gaze area displacing the first group of collinear document character images,
   the first group of collinear document character images moves into the second inspection area displacing the third group of collinear document character images, and
   the third group of collinear document character images displaces the fifth group of collinear document character images.

* * * * *